INVENTOR,
W. E. A. SCHMIDT
BY
ATTORNEY

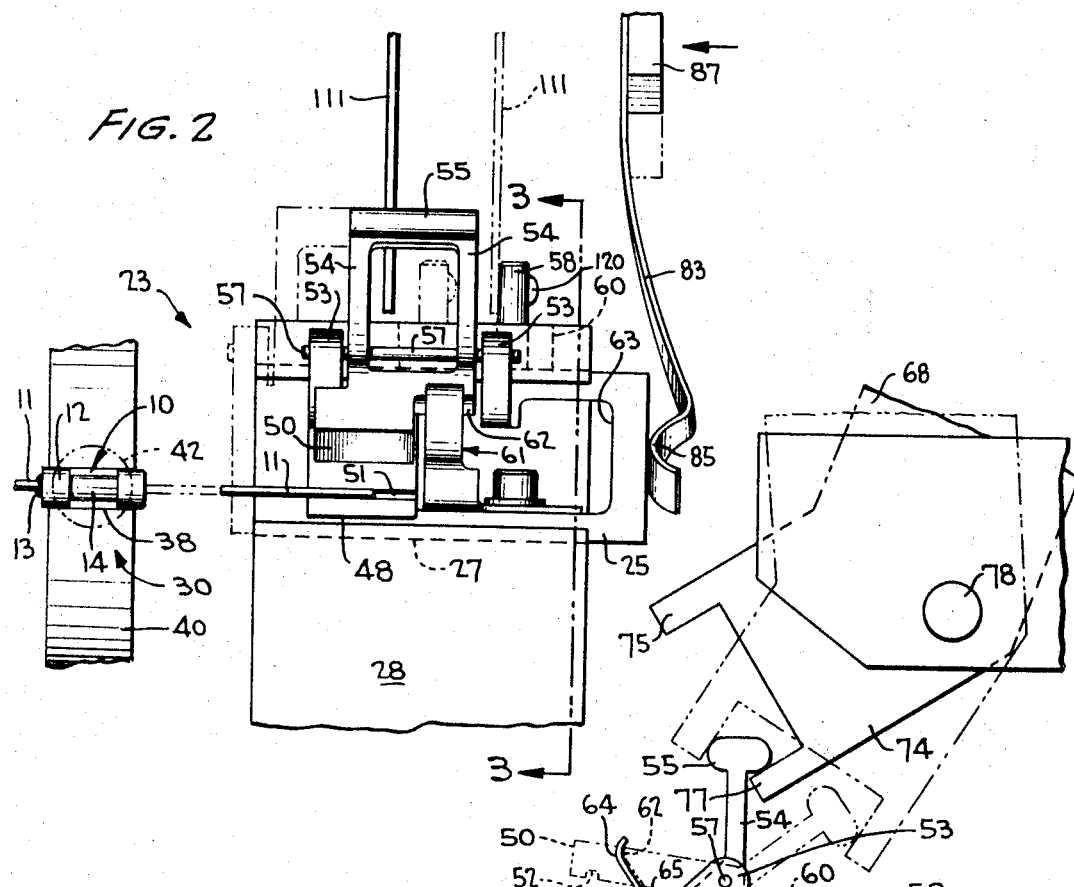

United States Patent Office 3,437,782
Patented Apr. 8, 1969

3,437,782
METHODS OF AND APPARATUS FOR PERCUSSIVELY WELDING AN ELEMENT TO AN OBJECT
Wilhelm E. A. Schmidt, Winston-Salem, N.C., assignor to Western Electric Company, Incorporated, New York, N.Y., a corporation of New York
Filed Mar. 24, 1965, Ser. No. 442,254
Int. Cl. B23k 9/22, 11/12
U.S. Cl. 219—95                                                          7 Claims

ABSTRACT OF THE DISCLOSURE

This disclosure concerns percussive welding of a wire lead to a metal cap of an electrical component. A wire lead is inserted in a chuck which exerts a predetermined gripping force. A potential difference is established between the lead and the metal cap. The chuck is then accelerated with an initiating force that is only applied during a portion of the movement toward the component. The inertia of the chuck impacts the lead against the cap and a discharge is obtained. Upon impact the motion of the lead is terminated while the chuck continues to move, sliding over the lead to prevent it from rebounding from the cap during welding.

---

This invention relates to methods of and apparatus for percussively welding an element to an object, and more particularly, to percussive welding methods and apparatus for reducing rebound of a movable workpiece which is impacted against and welded to a stationary workpiece.

To percussively weld together two workpieces, a welding arc is produced to melt adjacent portions of the workpieces, and then one of the workpieces is moved to impact the melted workpiece portions together, forming a molten weld junction which subsequently solidifies. It has been observed that the impact often causes solid, non-melted portions of the workpieces underlying the melted portions to come into contact as the melted portions are pushed aside, producing a rebound force. This force causes the movable workpiece to rebound away from the other workpiece before the molten portions of the weld junction solidify. Such movement due to the rebound force may bring about one of three undesirable conditions: no weld junction, a mechanically weak weld junction, or an internally stressed weld junction.

More particularly, in the production of electrical components, thin wire leads are percussively welded to metal termination caps which have been previously connected to the ends of each component. In accomplishing the percussive welding, it has been observed that the leads rebound from the cap before the weld junction solidifies. As a result, one of the three conditions noted above may occur which is especially troublesome in that not only the mechanical characteristics but also the electrical characteristics of the component are unfavorably affected. For example, if no weld junction is produced, the component is either discarded or a second attempt to weld the lead to the cap is necessary; if a mechanically weak junction is produced, the weld junction may fail when the lead is bent or pulled; if an apparently strong but internally stressed weld junction is produced, the junction may have an electrical resistance which is so high, due to internal stress, that the component is unusable.

Prior art percussive welding systems have utilized, among other devices, dashpots, weights, or resilient members in various ways to counteract the rebound force and to thereby prevent the above three undesirable conditions. However, while these types of prior art rebound-counteracting devices may eliminate rebound to some extent, these devices are impractical since none of them fully meet two important criteria of a rebound-preventing apparatus for use in percussively welding thin wire leads to electrical components. These two criteria are: (1) the initiation of a force generated to counteract the rebound force must coincide in time with the initiation of the rebound force on the lead, and (2) the rebound-counteracting force must continue to be generated after impact at least until the weld junction solidifies.

Accordingly, an object of this invention is to provide new and improved methods of and apparatus for percussively welding an element to an object.

Another object of this invention is to provide methods of and apparatus for percussively welding a movable workpiece to a stationary workpiece wherein rebound of the movable workpiece is reduced.

Still another object of this invention resides in methods of and apparatus for percussively welding a movable workpiece to a stationary workpiece wherein a rebound force produced by the impact of the movable workpiece on the stationary workpiece is eliminated to prevent relative motion between the workpieces until the molten metal weld joint between the workpieces solidifies.

With these and other objects in view, the present invention contemplates a method of percussively welding an element to an object. The method includes the steps of engaging the element with an inertial member which is slidable over such element, and then moving the inertial member toward the object to impact the element against such object. Resulting from this impact is a rebound force. Next, the inertial member is slid frictionally over the element upon the impact of the element with the object to reduce the rebound force exerted on the element due to impact.

The present invention also contemplates an apparatus for percussively welding an element to an object. The apparatus includes an inertial device which is frictionally slidable over the element for engaging such element. Further, facilities are provided for moving the inertial means toward the object to impact the element against the object and to slide frictionally the inertial device over the element. The impact results in a rebound force which is rebound by the frictional sliding of the inertial device over the element.

A complete understanding of this invention may be had by referring to the following detailed description and the accompanying drawings illustrating a specific embodiment thereof, wherein:

FIG. 2 is a front, elevational view taken perpendicularly to the top slanted surface of a lower stationary jaw of the chuck, showing the chuck in an opened position and showing the relationship of the chuck and of the chuck moving apparatus to a welding station at ta time just prior to percussive welding of the lead to a cap of the electrical component clamped to the welding station;

Figure 4:
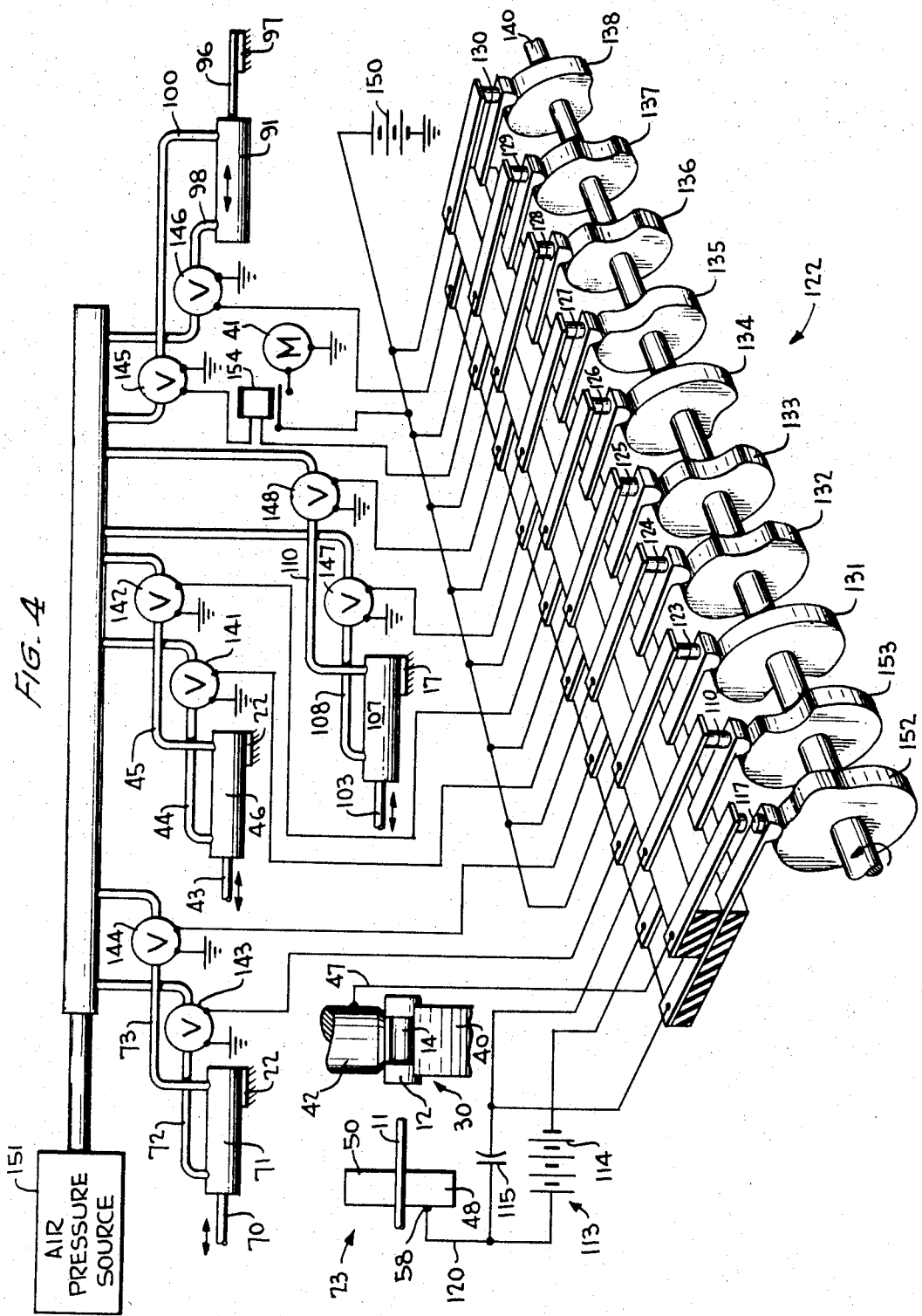

FIG. 3 is a side view, partly in section, taken along line 3—3 of FIG. 2, showing a chuck in its closed position prior to the percussive welding operation and also showing a special spring for facilitating both the closing and the opening of the chuck, and a trigger mechanism for releasing the chuck to weld the lead to the capped component; and FIG. 4 is a schematic diagram of a control system utilized to operate the percussive welding apparatus according to the principles of this invention.

Attention is first directed to FIG. 2 where there is shown an object or resistor 10 with an element or wire lead 11 attached to an end cap or termination cap 12 by a percussive weld junction 13 which may be produced by the novel apparatus and method of this invention. The end cap 12 has been attached to the tubular body 14 of the resistor 10 by a previous operation.

Figure 1:
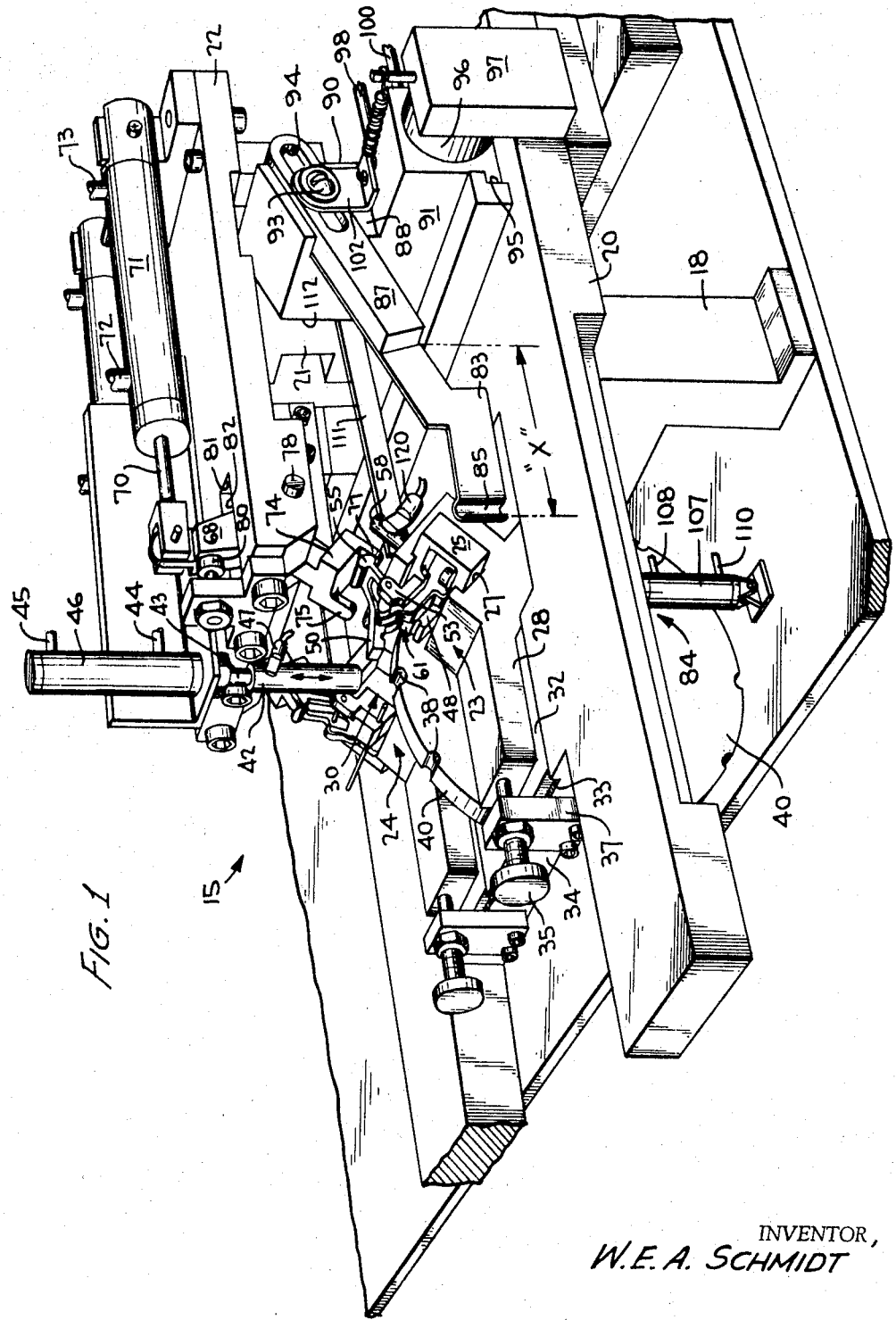
FIG. 1 is a perspective view of an apparatus for percussively welding a lead to an electrical component, whereby facilities are provided for preventing rebound of the lead after it is impacted against the component.

Referring now to FIG. 1, there is shown a novel percussive welding apparatus or welder 15 for performing the novel method of this invention. A base 17 supports legs 18 extending upwardly to carry an A-frame or platform 20 which supports the percussive welder 15. Attached to the platform 20 is a vertical extension 21; a horizontal extension 22 is attached to the vertical extension 21. The percussive welder includes right- and left-hand inertial members or chucks generally designated by the numerals 23 and 24, respectively. Since each chuck 23 and 24 is the structural and operational equivalent of the other, only the structure and operation of the right-hand chuck 23 will be hereinafter described.

The chuck 23, shown enlarged in FIGS. 2 and 3, includes a reciprocable slide block 25 which is freely movable in a track 27 of a chuck mounting block 28 between a welding station 30 and a start or retracted position (FIGS. 1 and 2). The chuck mounting block 28 is fixed to an electrically insulating plate 32 slidable in a track 33 formed in a lower cross bar 34 of the A-frame 20. The insulating plate 32 may be moved transversely to the path of the reciprocable slide block 25 by an adjusting screw 35 which is threaded through a support 37 and is rotatably attached to the front of the chuck mounting block 28. Rotation of the screw 35 moves the lead 11 held by the chuck 23 into coaxial alignment with the end cap 12 of the resistor 10, clamped at the welding station 30 (FIG. 2).

The welding station 30 may include one of a series of notches 38 cut into the periphery of a wheel 40, which is held for rotation in appropriate electrically non-conductive bearings (not shown); such notches 38 conform to the shape of the tubular body 14 of the resistors 10. A power device, such as a motor 41, FIG. 4, intermittently rotates the wheel 40 to serially present the resistors 10, secured in the notches 38 in any conventional manner, to the welding station 30 for welding the lead 11 to the end cap 12. The resistors are fed into the notches 38 by a standard feeding expedient (not shown).

Alternatively, a fixed member or anvil (not shown) electrically insulated from the frame 20 and having a notch therein similar to the notches 38 may be substituted for the notch member 40. Resistors 10 may be hand fed one at a time into such notch 38 after each welding operation.

The welding station 30 also includes a hold-down clamp 42, FIG. 1, which extends through the horizontal extension 22 of the frame 20 in vertical alignment with a properly positioned notch 38. The clamp 42 is movable downwardly by an electrically non-conductive piston rod 43 to clamp the resistor 10 resting in one of the notches 38 for a welding operation and is retractable upwardly after the welding operation. The piston rod 43 is selectively operable by application of pressure to air lines 44 and 45 of an associated air piston-cylinder 46. The clamp 42 is made of a conductive material and is of a size sufficient to contact both end caps 12 of the resistors 10 when the clamp 42 is in its downward position (See FIGS. 2 and 4). One lead 47 of a welding circuit, FIG. 4, is connected to the hold-down clamp 42.

Referring generally to FIG. 1 and particularly to FIGS. 2 and 3, the details of the right-hand chuck 23 are shown. In addition to the slide block 25, the chuck 23 includes a lower jaw 48 and a pivotal upper jaw 50, each having mating grooves 51 and 52 for engaging slidably with a predetermined, transverse force the lead 11 when the upper jaw 50 is pivoted to the closed position as illustrated in FIG. 3. The mass of the chuck 23 is large relative to that of the lead 11. Therefore, when the lead 11, engaged slidably by the jaws 48 and 50, strikes the fixed end cap 12 of the resistor 10 at a high velocity, the mass of the chuck 23 maintains the chuck 23 in motion, sliding the jaw grooves 51 and 52 over the lead 11. The grooves 51 and 52 are polished so that upon closing of the jaws 48 and 50 a predetermined frictional force in the direction of chuck motion is applied to the lead 11 as the chuck 23 slides over such lead 11.

The lower jaw 48, FIG. 3, is fixed slantingly to the slide block 25 and includes projections 53 for mounting the upper jaw 50. Since the lower jaw is slanted, if the lead 11 held in the chuck 23 fails to become welded to the end cap 12 during the welding operation, the lead 11 will be removed from the groove 51 by gravity when the chuck 23 is opened. Such removal of the lead 11 prevents the welder 15 from becoming jammed during a subsequent welding operation.

The upper jaw 50, which includes levers 54 and an elongated cross bar 55 which bridges such levers 54, is pivotally mounted on a pin 57 extending through bores in the levers 54; the pin 57 is held in holes in the projections 53.

Movement of the chuck 23 toward and away from the welding station 30 is limited by a stud 58 attached to the slide block 25 and extending through a slot 60 in the chuck mounting block 28.

A generally S-shaped spring 61, FIG. 3, engages a contact lobe 62 of the upper jaw 50. The spring 61 is fixed to the slide block 25 through a cut-out portion 63 thereof. An upper bent portion 64 of the spring 61 maintains the upper jaw 50 in an open condition, while a lower bent portion 65 maintains the upper jaw 50 in a closed condition to exert the predetermined transverse force on the lead 11 which is engaged slidably by the grooves 51 and 52 of the jaws 48 and 50. This lower bent portion 65 acting on the contact lobe 62 cooperates with the polished grooves 51 and 52 to generate the predetermined frictional force on the lead 11 engaged slidably by the chuck jaws 48 and 50 when such jaws 48 and 50 slide over the lead 11. Typically, the exact shape of the lower bent portion 65 of the spring 61 is empirically determined. In making such determination, the product of (1) the transverse force exerted on the lead 11 by the jaws 48 and 50 and (2) the coefficient of static friction between the polished grooves 51 and 52 and the lead 11 is equal to or less, at any given instant of time, than the rebound force exerted on the lead 11 when such lead 11 is impacted against the end cap 12. Additionally, the product of (1) the transverse force exerted on the lead 11 by the jaws 48 and 50 and (2) the coefficient of sliding friction between the polished grooves 51 and 52 and the lead 11 must also be equal to or less at any given instant of time during which time the rebound force is being exerted on the lead 11. Also, the lower bent portion 65 must be so formed that the product of the transverse force exerted on the lead 11 and the coefficient of static friction is small enough to permit the jaws 48 and 50 to begin sliding over the lead 11 immediately upon the lead 11 striking the end cap 12 of the resistor 10 clamped at the welding station 30. That is, the product of (1) the transverse lead-engaging force and (2) the coefficient of static friction must be less than the product of (1) the mass of the chuck 23 and (2) the acceleration of such chuck 23 toward the welding station 30.

A middle bent portion 65 of the spring 61 engages the lobe 62 during opening and closing the upper jaw 50 to provide a "snap-action."

A mechanism, FIG. 1, for opening and closing the upper jaw 50 includes a link 68 pivotally mounted on a pin 69 and driven by a reciprocable piston rod 70 of an air piston-cylinder 71 selectively operable by the application of pressure to associated air lines 72 and 73. Depending from the lower end 74 of the link 68 is a first bifurcation 75 positioned at the left front of the lower end 74 and a second bifurcation 77 positioned at the right rear of the lower link end 74. Upon forward movement of the piston rod 70, the first bifurcation 75 pulls back on the cross bar 55 to open the upper jaw 50.

The second bifurcation 77 closes the upper jaw 50 by pushing forward on the cross bar 55 when the piston rod 70 moves rearwardly. The bifurcations 75 and 77 are spaced apart along the length of the cross bar 55 in such a manner that the upper jaw 50 may be opened or closed regardless of the position of the chuck 23 with respect to the welding station 30.

The pivotal motion of the link 68 on the pin 69 is limited forwardly by an adjustable stop member 80 and rearwardly by a back surface 81 of a slot 82 formed on the horizontal extension 22 of the frame 20 to which the pin 69 is mounted.

Facilities for impelling the lead 11 held by the chuck 23 toward the end cap 12 for percussive welding thereto include an elongated leaf spring 83 and a trigger mechanism 84 (FIGS. 1 and 3). One end of the leaf spring 83 is formed into a protrusion 85 for contacting the slide block 25. The other end of the leaf spring 83 is held by a slidable support member 87 against a first side 88 of a vertical electrically insulating member 90 fixed to a movable air cylinder 91 by a bolt 93 which passes through a slot 94 in the slidable support member 87 and through a hole in the leaf spring 83. The cylinder 91 is movable in a track 95 by interaction with a stationary piston 96 fixed to a vertical portion 97 of the frame 20 upon selective pressurization of air lines 98 and 100 connected to the cylinder 91. A coil spring 101 is attached to the vertical portion 97 and to a non-conductive bracket 102 depending from and held by the bolt 93 to return the cylinder 91 from a leftward position to a rightward position (FIG. 1).

The upper portion of the protrusion 85 of the leaf spring 83 contacts the slide block 25 to exert an impelling force on the slide block 25 when the cylinder 91 is moved to the leftward position. The lower portion of the protrusion 85 of the leaf spring 83 extends vertically downward and contacts the adjacent side of the chuck mounting block 28 after the adjacent end of the slide block 25 has moved past such side of the chuck mounting block 28 as the chuck 23 moves toward the welding station 30. Thus, movement of the leaf spring 83 toward the welding station 30 is limited.

The magnitude of the impelling force exerted by the leaf spring 83 on the slide block 25 may be varied by loosening the bolt 93 and moving the support member 87 backward or forward while holding the spring 83 stationary to change the length of the force arm X between the protrusion 85 and the forward end of the support member 87. Illustratively, shortening the length X results in a greater impelling force exerted on the slide block 25 by the leaf spring 83 for a given amount of leftward movement of the cylinder 91.

The trigger 84, FIG. 3, includes a reciprocable, spring-biased rod 103 which passes through a bore 104 in the chuck mounting block 28 and normally engages a notch 105 in the lower portion of the slide block 25. When the rod 103 engages the notch 105 in this manner, the chuck 23 is held in the start or retracted position (FIG. 2). The chuck 23 being held at the start position, the end of the slide block 25, which is contactable by the protrusion 85 of the spring 83, is positioned away from the adjacent side of the chuck mounting block 28 by a distance equal to the distance between the end cap 12 of the resistor 10 clamped at the welding station 30 and the adjacent end of the lead 11 engaged slidably in the chuck 23. Thus, as the end of the lead 11, engaged slidably in the chuck 23, comes into contact with the end cap 12, the lower portion of the protrusion 85 of the leaf spring 83 comes into contact with the adjacent side of the chuck mounting block 28, preventing further movement of the spring 83. An air piston-cylinder 107 is operable by selectively pressurized air lines 108 and 110 to pull the trigger rod 103 downwardly.

A return bar 111, FIGS. 1 and 2, is mounted on a second side 112 of the electrically insulative vertical member 90 fixed to the movable cylinder 91. The return bar 111 is engageable with the stud 58 upon rightward movement of the cylinder 91 by the spring 101 to return the chuck 23 to the start or retracted position after the lead 11 has been welded to the end cap 12, whereupon, the trigger rod 103 enters the notch 105 in the slide block 25 to hold the chuck 23 against movement.

Referring now to FIG. 4, a welding circuit 113 which may include a high energy voltage source 114, a capacitor 115, a normally open switch 117, and a normally closed switch 118, has one conductor 120 connected to the stud 58 of the slide block 25 and the other conductor 47 connected to the hold-down clamp 42. With the switches 117 and 118 in the normal position, the source 114 charges the capacitor 115 to a high voltage. When it is desired to impress a welding voltage on the leads 120 and 47, switch 117 is closed simultaneously with opening of switch 118.

There is also shown a control system 122 for operating the various parts of the welder 15 in a timed relationship. Advantageously, the control system 122 may include normally closed switches 123–130 selectively opened by a series of cams 131–138 mounted on a common shaft 140 which is continuously rotated by a motor (not shown). Each switch 123–130 controls one, normally closed, solenoid operated valve 141–148 in each of the air lines of air line pairs 44–45, 72–73, 98–100, and 108–110 of the air piston-cylinders 46, 71, 91, and 107, respectively, by momentarily disconnecting the solenoid operated valve from a voltage source 150 when the switches 123–130 momentarily open. Each air line 44, 45, 72, 73, 98, 100, 108, 110 is connected to a source of pressure 151. Two additional cams 152 and 153 also mounted on the shaft 140 control the switches 117 and 118 in the welding circuit 113.

ADJUSTMENTS

Prior to operation of the welder 15, several preliminary adjustments are made. The screw 35 is rotated to position the polished groove 51 of the lower jaw 48 coaxially with the center of the end cap 12 secured to the tubular resistor body 14 gripped by the clamp 42 at the welding station 30. The lower bent portion 65 of the spring 61 is also adjusted to exert the predetermined force on the contact lobe 62 when the upper jaw 50 is closed so that after the lead 11, held in the grooves 51 and 52 of the jaws 48 and 50, strikes the end cap 12 the chuck 23 slides frictionally over the lead 11 to prevent rebound of the lead 11.

The force arm X of the leaf spring 83 is adjusted to exert a desired impelling force on the slide block 25 to move the chuck 23 and weld the lead 11 to the end cap 12 and to accelerate the chuck 23 leftwardly to frictionally slide the jaws 48 and 50 over the lead 11 after impact of the lead 11 and the cap 12 while the molten weld junction 13 is solidifying. The cam 132 is adjusted to operate the valve 144 and open the jaw 50 by moving the rod 70 only after the chuck 23 has ceased sliding frictionally and the weld junction 13 between the lead 11 and the end cap 12 has solidified. The time of the opening of the jaw 50 is empirically determined by observing the solidification time of a typical weld junction and of the time necessary for the chuck 23 to cease sliding frictionally.

OPERATION

In operation, the resistors 10 are successively fed by apparatus (not shown) to the notches 38 in the wheel 40. Assuming that the shaft 140 is continuously rotating to rotate the cams 131–138, 152 and 153, the switch 129 is first opened by the rotation of the cam 137 to open the circuit of the normally operated relay 154. The opening of this circuit releases relay 154 to close the contacts 155 to energize the motor 41.

Energization of the motor 41 rotates the wheel 38 to present the resistor 10 which is secured to one of the notches 38 at the welding station 30. At this time, the slide block 25 of the chuck 23 is held in the initial or start position by the upwardly, spring-biased trigger rod 103.

Further rotation of the shaft 140 rotates the cam 138 to open switch 130 to operate solenoid valve 146. Operation of the valve 146 operates the air cylinder 91 to move such cylinder 91 leftwardly to urge the protrusion 85 against the slide block 25 to thereby deform the spring 83 to store potential energy in the spring 83 which subsequently produces the impelling force on the slide block 25.

Next, the cam 134 opens the switch 126 to operate the solenoid valve 142. Operation of the solenoid valve 142 operates air piston-cylinder 46 to move the piston rod 43 downwardly. Such downward movement of the rod 43 moves the clamp 42 against the resistor 10 to connect electrically the end cap 12 to the lead 47 of the welding circuit 113 and to clamp securely such resistor 10 in the notch 38 with the end caps 12 being exposed.

Further, at this time, wire stock is fed into the groove 51 of the lower jaw 48 and is cut to a desired length to form the wire lead 11. (For such a feeding and cutting apparatus see, for example, U.S. Patent No. 3,146,334, issued on Aug. 25, 1964, to C. F. Kinser et al. or U.S. Patent No. 3,156,966, issued on Nov. 17, 1964, to J. C. Houda, Jr., et al.)

Similar to the operation of the switches 126, 129, and 130, switch 123 is opened by the cam 131 to operate the solenoid valve 143. Operation of the solenoid valve 143 operates air piston-cylinder 71 to move rearwardly the rod 70. Rearward movement of the rod 70 rotates the link 68 on the pin 69 to move forwardly the bifurcation 77 of the lower portion 74 against the cross member 55 to also move forwardly such cross member 55. Such forward movement of the cross member 55 closes the upper jaw 50 against the lower jaw 48 to engage slidably with the groove 52 the lead 11 held in the groove 51 in the lower jaw 48. The lower bent portion 65 of the spring 61 acting on the contact lobe 62 of the upper jaw 50 exerts the predetermined, transverse force on the lead 11 held in the grooves 51 and 52.

Next, the cams 135, 152, and 153 simultaneously operate the switches 127, 117, and 118, respectively, to open switches 127 and 118 and to close the switch 117.

Opening of switch 127 operates the solenoid valve 147 to operate the air piston-cylinder 107 to move downwardly the rod 103. This downward movement removes the rod 103 from the notch 105 in the slide block 25 and enables the protrusion 85 of the deformed leaf spring 83 to impel the slide block 25 and the lead 11 held in the grooves 51 and 52 toward the welding station 30.

The closing of switch 117 and the opening of the switch 118, removes the capacitor 115 from the charging source 114 and connects the capacitor 115 to the conductor 47 and 120. One side of the capacitor 115 now applies a welding potential to the lead 11 through a circuit which includes the lead 120, the stud 58, the slide block 25, the jaws 48 and 50, and the lead 11. The other side of the capacitor 115 applies a welding potential to the end cap 12 through a circuit which includes the conductor 47, the clamp 42, and the end cap 12 (FIGS. 2 and 4).

As the lead 11, engaged slidably by the chuck 23, approaches the end cap 12, the welding arc is initiated by the capacitor 115 between the lead 11 and an adjacent portion of the end cap 12 to melt the end of the lead 11 and such adjacent portion of the end cap 12.

Continued movement of the chuck 23 impacts the melted end of the lead 11 against the melted portion of the end cap 12, forming the molten weld junction 13. As the melted end of the lead 11 impacts against the melted portion of the end cap 12, the lower portion of the protrusion 85 of the leaf spring 83 contacts the adjacent wall of the chuck mounting block 28 thus preventing further movement of the spring 83. The molten weld junction 13 is pushed aside and solid portions of the lead 11 and the end cap 12 underlying the melted portions come into contact to exert the rebound force on the lead 11. Additionally, the protrusion 85 is unable to further exert the impelling force on the slide block 25 because the movement of the spring 83 has been stopped. However, the acceleration and the mass of the chuck 23 are sufficient to continue movement of the chuck 23 toward the welding station 30, thereby sliding frictionally the polished grooves 51 and 52 of the jaws 48 and 50 over the lead 11. Such sliding produces a predetermined frictional force on the lead 11 and dissipates the kinetic energy of the chuck 23 to counteract the rebound force on the lead 11. The chuck 23 continues to slide frictionally over the lead 11 until the molten weld junction 13 has solidified. When the kinetic energy of the chuck 23 has been completely dissipated by sliding frictionally over the lead 11, the chuck 23 ceases movement.

Next, the cam 132 opens the switch 124 to operate the solenoid valve 144. Operation of the solenoid valve 144 operates the air piston-cylinder 71 to move forwardly the rod 70. Forward movement of the rod 70 rotates the link 68 on the pin 69 to move rearwardly the bifurcation 75 on the lower portion 74. Rearward movement of the bifurcation 75 moves rearwardly the cross member 55 to open the upper jaw 50 and to disengage the groove 52 from engagement with the lead 11.

At this time, the cams 133 and 136 simultaneously open the switches 125 and 128, respectively.

The opening of the switch 125 operates the solenoid valve 141 to operate the air piston-cylinder 46. Operation of the air piston-cylinder 46 moves upwardly the rod 43 to remove the clamp 42 from contact with the resistor 10 secured in the groove 38 of the wheel 40 to which the lead 11 has just been welded.

Opening of the switch 128 operates the solenoid valve 148 to operate the air piston-cylinder 107. Such operation of the air piston-cylinder 107 moves upwardly the rod 103 to engage the notch 105 in the slide block 25 when the chuck 23 is returned to the start position.

Finally, the cam 137 opens the switch 129. Opening the switch 129 operates the solenoid valve 145 to move rightwardly the cylinder 91. The spring 101 aids in such rightward movement of the cylinder 91.

Rightward movement of the cylinder 91 brings the return bar 111 into contact with the stud 58 to move the chuck 23 back to the initial or start position. When the chuck 23 reaches the initial or start position, the upwardly, spring-biased rod 103 again enters the notch 105 in the slide block 25 to hold slide block 25 against movement.

Additionally, opening of the switch 120 deenergizes the circuit of the solenoid valve 145 to close the contact 155 to momentarily operate the motor 41. Such momentary operation of the motor 41 rotates the wheel 40 to present the next resistor 10 secured to the groove 38 at the welding station 30 for the next welding cycle.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:
1. In a method of precussively welding an element to an object, the steps of:
   holding the element in a chuck which exerts a predetermined gripping force on the element, one end of the element projecting from the chuck;
   applying an accelerating force to the chuck through a predetermined distance to accelerate the chuck to a predetermined velocity in a direction toward the object such that the chuck acquires a predetermined amount of kinetic energy;
   removing said accelerating force when the chuck has moved through said predetermined distance whereupon the inertia of the chuck advances the element to impact against the object; and dissipating the kinetic energy of the chuck upon impact of the element against the object by sliding the chuck over the element such that sliding frictional forces exerted on the chuck by virtue of the gripping force on the element dissipate the kinetic energy of the chuck and prevent the element from rebounding from the object.

2. A method of percussively welding a wire lead to a metal cap of a stationary electrical component, which comprises:

holding the wire lead in a chuck which exerts a predetermined gripping force on the lead, one end of the lead projecting from the chuck;

producing a difference in electrical potential between the lead and the metal cap;

applying an accelerating force to the chuck through a predetermined distance to accelerate the chuck to a predetermined velocity in a direction toward the component to impart a predetermined amount of kinetic energy to said chuck which moves the wire lead toward the component to establish a welding arc between the metal cap and the projecting end of the wire to melt portions thereof;

removing said accelerating force when the chuck has moved through said predetermined distance whereupon inertia of the chuck advances and impacts the projecting end of the lead against the metal cap to bring together the melted portions thereof; and sliding the chuck over the lead upon impact to exert sliding frictional forces to dissipate the predetermined kinetic energy of the chuck and prevent rebounding of the chuck and percussively welded wire lead.

3. In an apparatus for percussively welding an element to an object, the combination of:

means for applying an accelerating force to the element through a predetermined distance to accelerate the element to a predetermined velocity in a direction toward the object;

means for removing said accelerating force from the element when the element has moved through said predetermined distance and prior to engagement with the object whereupon the element advances to impact against the object; and means for applying sliding frictional forces to the element upon impact of the element against the object to prevent the element from rebounding from the object.

4. In an apparatus for percussively welding an element to an object, the combination of:

chuck means for holding the element with one end thereof projecting from said chuck means, said chuck means applying a predetermined gripping force on the element;

means for applying an accelerating force to said chuck means through a predetermined distance to accelerate said chuck means to a predetermined velocity in a direction toward the object whereupon said chuck means acquires a predetermined amount of kinetic energy; and means for removing said accelerating force from said chuck when said chuck means has moved through said predetermined distance and prior to engagement with said object whereupon the inertia of said chuck means advances the element to impact against the object, the kinetic energy of said chuck means being dissipated upon impact of the element against the object by sliding movement of said chuck means over the element to apply sliding frictional forces to the element to prevent rebound of the element from the object.

5. An apparatus for percussively welding a wire lead to a metal cap of a stationary electrical component, which comprises:

chuck means for holding the wire lead with one end thereof projecting from said chuck means, said chuck means including facilities for applying a predetermined gripping force on the lead;

means for establishing a potential difference between the lead and the metal cap;

means for applying an accelerating force to said chuck means through a predetermined distance to accelerate said chuck means to a predetermined velocity in a direction toward the component whereupon said chuck means acquires a predetermined amount of kinetic energy and upon movement toward the component a welding arc is established between the metal cap and the projecting end of the wire to melt portions thereof; and means for removing said accelerating force when said chuck means has moved through said predetermined distance to permit the inertia of said chuck means to advance the projecting end of the lead to impact against the metal cap to bring together the melted portions thereof, said chuck means sliding over the lead upon impact to exert frictional forces on the lead to prevent its rebound from the metal cap during welding of the lead to the metal cap.

6. An apparatus for percussively welding a wire lead to a metal cap of a stationary electrical component, as set forth in claim 5, in which said chuck means comprises:

a set of jaws for gripping the wire lead, said jaws having polished surfaces which engage the lead; and means for urging said jaws together to apply a predetermined gripping force to the lead such that upon impact of the lead against the element, the jaws slide over the lead to apply a frictional force determined by the product of said predetermined gripping force and the coefficient of friction of said polished surfaces and lead to prevent the lead from rebounding from the metal cap.

7. In a device for percussively welding a wire to an article:

a mounting block having a guide trackway formed thereon;

a chuck means slidably mounted in said guide trackway for movement toward and away from an article to be welded, said chuck means comprises a first jaw having a first transverse slot and a second jaw pivotably mounted with respect to said first jaw and having a second transverse slot in alignment with said first transverse slot to receive a wire with an end projecting from the jaws toward a first end of said guide trackway and in position to be percussively moved into engagement with the article;

spring means for urging said second jaw into engagement with said first jaw;

a leaf spring overlying the other end of said guide trackway;

a latch for holding the chuck means projecting from said other end of said guide trackway to bear against and deflect said leaf spring;

means for applying an electrical potential across said chuck means and the article; and means for releasing the latch and applying the force of the deflected lead spring to impel the chuck means along the trackway and move the projecting wire into percussive engagement with the article whereupon the leaf spring engages said other end of the guide trackway while the chuck means moves the wire into engagement and whereafter the spring urged jaw moves relative to the engaged wire.

(References on following page)

References Cited

UNITED STATES PATENTS

| | | | |
|---|---|---|---|
| 2,430,260 | 11/1947 | Trott | 219—95 |
| 2,921,177 | 1/1960 | Gellatly | 219—95 |
| 2,485,790 | 10/1949 | Trott. | |
| 2,501,060 | 3/1950 | Leibing. | |
| 2,644,067 | 6/1953 | Watson. | |
| 2,809,274 | 10/1957 | Quinlan. | |
| 2,960,362 | 11/1960 | Garvey. | |
| 2,961,204 | 11/1960 | Rayfield. | |

RICHARD M. WOOD, *Primary Examiner.*

C. CHADD, *Assistant Examiner.*

U.S. Cl. X.R.

219—96